W. H. SCHULTE.
FLUSH VALVE OPERATING MECHANISM.
APPLICATION FILED JUNE 5, 1913.

1,171,468.

Patented Feb. 15, 1916.

Witnesses
J. R. Donovan
P. M. Tilden

Inventor:
William H. Schulte
by his Attys
Philipp Sawyer Rice & Kennedy

UNITED STATES PATENT OFFICE.

WILLIAM H. SCHULTE, OF TRENTON, NEW JERSEY.

FLUSH-VALVE-OPERATING MECHANISM.

1,171,468.  Specification of Letters Patent.  Patented Feb. 15, 1916.

Application filed June 5, 1913. Serial No. 771,846.

*To all whom it may concern:*

Be it known that I, WILLIAM H. SCHULTE, a citizen of the United States, residing at Trenton, county of Mercer, and State of New Jersey, have invented certain new and useful Improvements in Flush-Valve-Operating Mechanism, fully described and represented in the following specification and the accompanying drawings, forming a part of the same.

This invention relates to operating devices for the control of flush valves, and has for its object the provision of a simple device easily attachable to the flush tank and connected with the flush valve.

Figure 1:
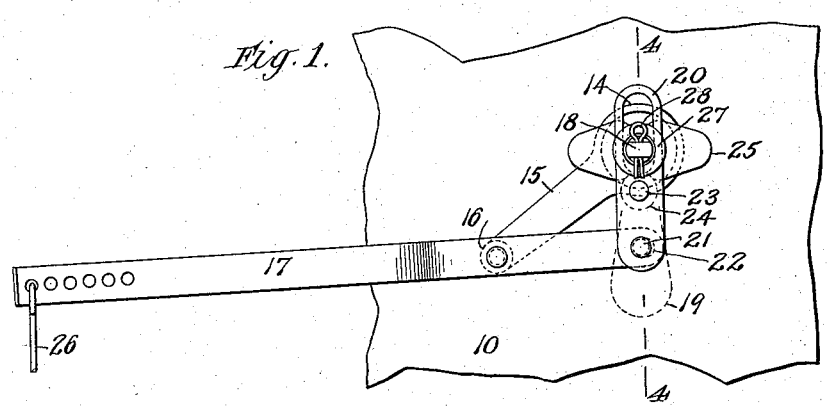
Figure 2:
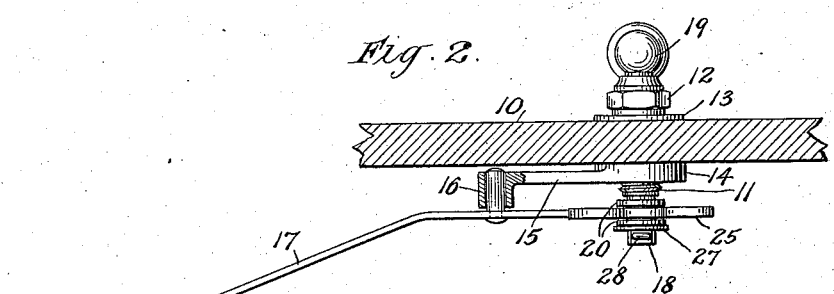
Figure 3:
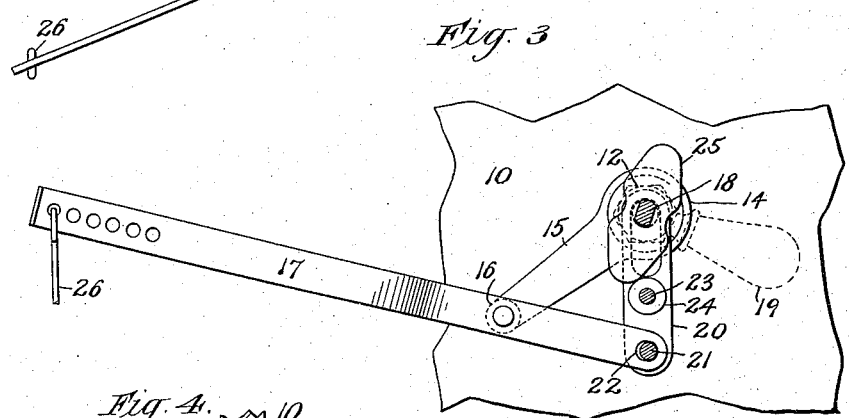

Referring to the drawings: Figure 1 is an elevation of the device as it appears from the inside of the tank; Fig. 2 is a plan partly in section; Fig. 3 is a view similar to Fig. 1 and showing a second position of the device, and Fig. 4 is a sectional elevation on the line 4—4 of Fig. 1.

Figure 4:
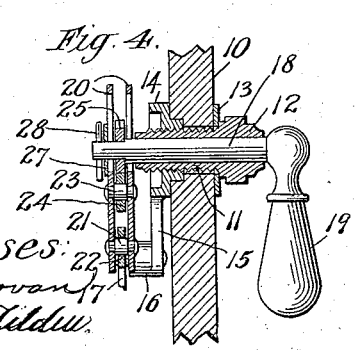

The tank wall 10 is bored as shown in Fig. 4 to receive a sleeve 11 provided with a head 12 and threaded as shown. The head is equipped with a washer 13 and is shaped to form a bolt head so that it may be screwed into the clamping nut 14 which binds the sleeve securely in the tank wall. The nut 14 is provided with an extension 15 having a bored offset projection 16 which serves as a fulcrum for the operating lever 17 which is preferably of the first order. A spindle 18 equipped with the handle 19 rotates within the sleeve 11, and the lever 17 is tied to this spindle by a pair of slotted links 20, 20, the lower ends of the links having a pin 21 and slot 22 connection with lever 17, and the upper ends are slotted to embrace the spindle as shown. The pins 21 and 23, the latter carrying a friction roll 24, act as distance pieces to hold the links 20, 20 parallel with each other. Keyed upon the spindle 18 and positioned between the links is a double cam 25, either cam edge of which is adapted to contact with the roll 24, and thereby depress the links and right hand end of lever 17, whenever the handle 19 is rocked in either direction. This movement causes the outer extremity of lever 17 to move upward, pulling upon the connection 26 to actuate the flush valve. The spindle 18 is held in place, together with the related parts, by a washer 27 and cotter pin 28.

What is claimed:

1. A flush valve actuating mechanism including a spindle, a lever, a fulcrum for the lever, a pair of links slotted to receive the spindle and connected with said lever, and a cam mounted upon the spindle and engaging the links to move the lever.

2. A flush valve actuating mechanism including a spindle, a lever, a fulcrum for the lever, a pair of links slotted to receive the spindle and connected with said lever, and a double cam mounted upon the spindle between the links and engaging the links to move the lever upon a movement of the cam in either direction.

3. A flush valve actuating mechanism including a spindle, a cam keyed to the spindle, a pair of slotted links guided by the spindle and inclosing the cam, a friction roll located between the links and engaged by the cam, the said links being adapted to operate a lever mechanism when actuated by the cam.

4. A flush valve actuating mechanism including a threaded sleeve, a nut secured to the sleeve and having an extension adapted to serve as a fulcrum, a spindle adapted to rotate in said sleeve, a lever mounted upon said fulcrum, slotted links mounted upon the spindle and connected with said lever, and a cam mounted upon the spindle between the links and engaging the links to actuate the lever when the cam is rotated.

In testimony whereof, I have hereunto set my hand, in the presence of two subscribing witnesses.

WILLIAM H. SCHULTE.

Witnesses:
ELWOOD L. FUHL,
FRANKLIN BURKERT.

Copies of this patent may be obtained for five cents each, by addressing the "Commissioner of Patents, Washington, D. C."